United States Patent Office 3,228,781
Patented Jan. 11, 1966

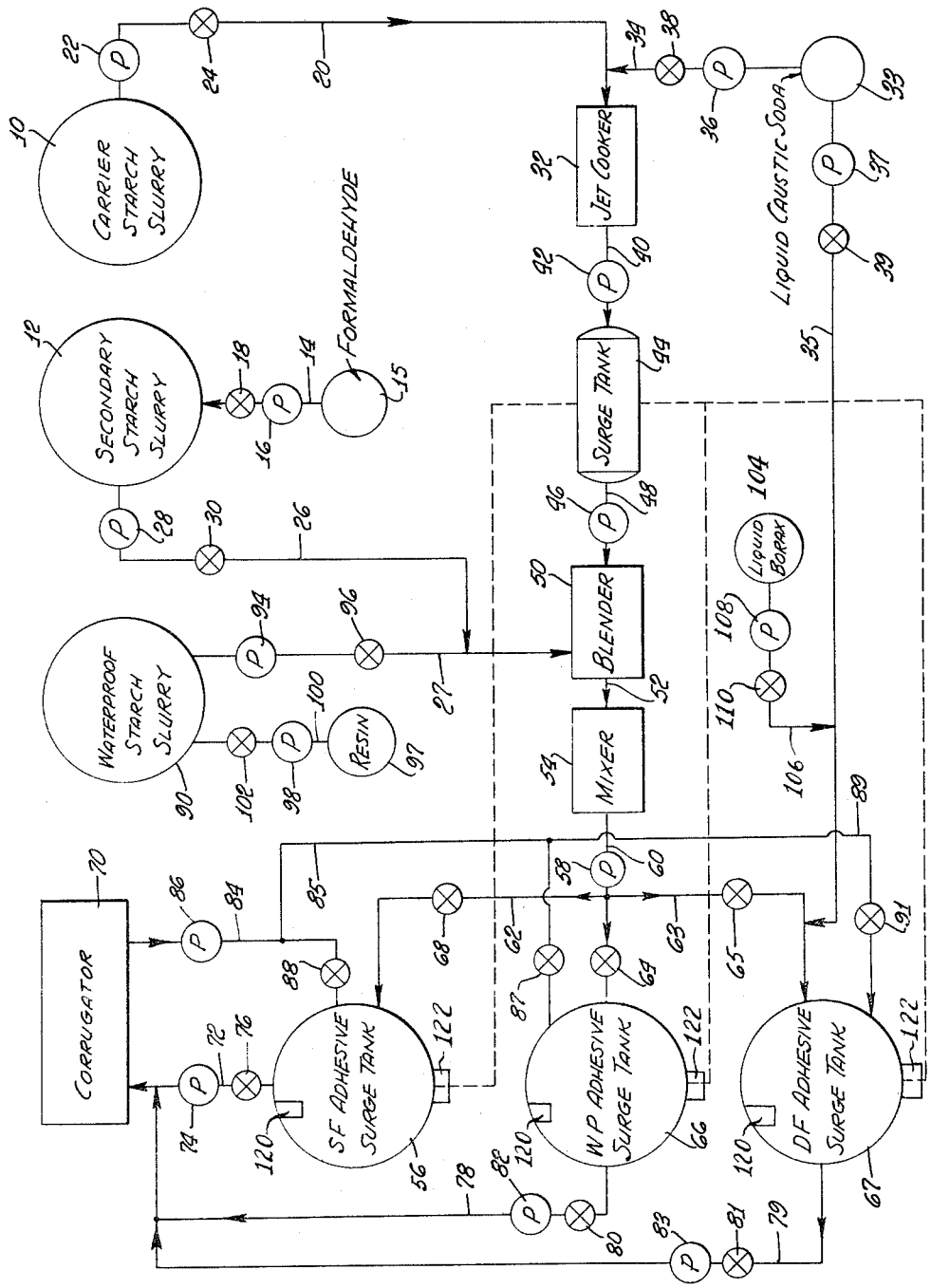

3,228,781
CONTINUOUS COOKING AND BLENDING OF STARCH ADHESIVE FOR THE CORRUGATING INDUSTRY
Walter Halpert, Los Angeles, Calif., assignor to The Viscomatic Corporation, Los Angeles, Calif., a corporation of California
Filed Apr. 30, 1962, Ser. No. 190,979
6 Claims. (Cl. 106—213)

This invention relates to a process for preparing adhesive agents, and more particularly it relates to a process for preparing starch adhesives so that substantially uniform optimum viscosity of the starch adhesives is maintained until used.

Certain industries, such as the corrugated paper box industry, daily consume large quantities of starch adhesives. Corrugated paper boxes are fabricated, generally, of three sheets or plys of paper which are bonded together, the inner sheet embodying a series of flutes. To the crowns of these flutes is applied the starch adhesive, and bonded to the inner sheet are the two outer sheets or liners.

The starch component of the adhesives is suspended in water, the starch generally being insoluble in water. In order to hold the starch in suspension and prevent settling out, it has been found if about 16% of the total starch content of the starch adhesive is cooked to thereby provide a "carrier," the uncooked starch will more readily stay in suspension to provide a relatively viscous adhesive starch paste.

Although the raw or uncooked starch and water slurry is the principal adhesive component and is resistant to mechanical treatment such as the shearing effect of pumping, stirring and circulating through lines, the cooked or gelatinized starch is very unstable in the presence of this mechanical treatment and breaks down to adversely affect the viscosity of the adhesive starch paste, a most critical requirement.

It has been found that breakdown of the viscosity of the adhesive starch paste occurs during three stages: (1) while the carrier starch slurry is being cooked and gelatinized, (2) after the adhesive starch paste has been prepared and is being circulated, and (3) during use. Avoidance of or minimizing any one or all of the stages will result in improving the maintenance of the uniform viscosity of the adhesive starch paste.

The first stage contributing to viscosity breakdown of the adhesive starch paste occurs as the result of the constant stirring of the carrier starch slurry while being cooked and gelatinized. The continual stirring shears the carrier starch slurry, and the shearing reacts adversely on the cooked starch component or portion of the adhesive.

The second stage contributing to viscosity breakdown of the adhesive starch paste occurs as the result of the circulating of the prepared adhesive starch paste and the long delays between storage of the adhesive starch paste and use. The preparation of large batch quantities of adhesive, well in advance of use, requires extensive storage facilities, and viscosity of the prepared adhesive starch paste and particularly the cooked or gelatinized portion is adversely affected while in storage due to the requirement for continuous agitation.

The third stage contributing to viscosity breakdown of the adhesive starch paste occurs as the result of extensive pumping of the adhesive starch starch paste from one location to another, the pumping also having a shearing affect on the cooked portion of the adhesive. After the adhesive starch paste is prepared, it is pumped to storage, and from storage it is pumped to the site of use where the adhesive starch paste is subjected to considerable shearing to cause a viscosity breakdown. From the site of use, excess adhesive is pumped back to storage. When large quantities of adhesive starch paste are in storage, there is a continual long-term cycling of the adhesive starch paste from storage to site of use, and back to storage. It has been found that this third stage contributes more to the breakdown of adhesive starch paste viscosity than the other two stages.

Thus, it is an object of this invention to provide a process for preparing adhesive starch paste for use primarily in the corrugated paper industry wherein cooking and blending of adhesive components are continuous and in determinable quantities so that stirring, pumping and circulating of the prepared adhesive starch paste is held to a minimum, and the prepared quantity of adhesive starch paste is such that long periods of storage are avoided, with the result that substantially optimum viscosity of the adhesive starch paste is maintained until used.

Another object of this invention is to provide a process for preparing adhesive starch paste where the viscosity and composition are controlled so as to provide an adhesive starch paste having a composition and viscosity which will produce an effective bonding together of materials.

These and other objects and advantages of the invention will become apparent from a consideration of the description which follows taken in conjunction with the drawings.

The single figure is a flow diagram illustrating processes for preparing a single phase adhesive starch paste, a waterproof adhesive starch paste and a double phase adhesive starch paste.

The process for preparing what is comomnly known in the corrugating trade as a single phase adhesive starch paste will be considered first. In each of tanks 10 and 12, cold or warm water is mixed with raw uncooked starch and the resultant suspensions, which will hereinafter be identified as the carrier starch slurry and the secondary starch slurry, respectively, are gently agitated to maintain the suspension. So long as the suspensions remain uncooked the mechanical agitation will cause no adverse effects. It is preferred that tanks 10 and 12 each have a capacity of about 2,000 gallons, and that about 1,000 gallons of water be mixed with about 1,000 pounds of starch in tank 10, and that about 1,800 gallons of water and borax be mixed with about 5,000 pounds of starch in tank 12, the borax contributing to the adhesive properties of the secondary starch slurry. Although preferred tank capacities and quantities have been given, it is to be understood that the capacities and quantities may be varied.

Communicating with tank 12 is a line 14 which delivers a metered or measured quantity of formaldehyde to be admixed with the secondary starch slurry to provide a secondary starch slurry mixture, the formaldehyde being stored in a drum 15. Disposed in line 14 is a metering pump 16 which meters the desired quantity of formaldehyde, and also disposed in line 14 is a valve 18.

Leading from tank 10 is a line 20 which has interposed therein a pump 22 and a valve 24, the pump being automatically energized and de-energized, and the valve being automatically opened and closed. Similarly, leading from tank 12 is a line 26 which junctures with a line 27 and which has interposed therein a pump 28, and a valve 30, the pump being automatically energized and de-energized and the valve being automatically opened and closed.

Communicating with line 20, upstream from a jet cooker 32, is a line 34 which delivers a measured quantity of liquid caustic which is stored in drum 33 and which is to be admixed with carrier starch slurry to provide a carrier starch slurry mixture. Measurement of the caustic is by a metering pump 36 which is interposed in line 34, and which is automatically energized and de-energized, and also interposed in line 34 is a valve 38 which is automatically opened and closed. If desired, the jet steam cooker 32 may also be automatically operated.

Also leading from drum 33 is a line 35, and disposed in line 35 is a pump 37 which is automatically energized and de-energized. Included in line 35 is a valve 39 which is automatically opened and closed. However, during the preparation of the single phase adhesive starch paste, line 35, pump 37 and valve 39 are not employed. The purpose of line 35, pump 37 and valve 39 will hereinafter be considered in greater detail.

The carrier starch slurry mixture after being cooked and gelatinized in the jet cooker 32 passes therefrom via line 40 and the now gelatinized carrier starch slurry mixture is delivered by pump 42 to a surge tank 44, and from the surge tank the carrier starch slurry mixture is pumped by a pump 46 via line 48 to a proportioning or measuring blender 50 where the desired quantity of carrier starch slurry mixture is blended with the desired quantity of secondary starch slurry mixture delivered to the blender via lines 26 and 27. The blended slurry mixtures then pass through a line 52 into a mixer 54 where the measured quantity of carrier starch slurry mixture is thoroughly mixed with the measured quantity of secondary starch slurry mixture to provide the single phase adhesive starch paste.

Delivery of the adhesive starch paste from the mixer 54 to a storage or surge tank 56 is by a pump 58 and via valve controlled lines 60 and 62. However, lines 60 and 62 form a juncture with a valve controlled line 63. When valve 64 in line 60 is closed and valve 65 in line 63 is closed, the single phase adhesive starch paste is prevented from flowing into a waterproof adhesive starch paste storage or surge tank 66 and a double phase adhesive paste starch storage or surge tank 67. With valve 68 in line 62 open the single phase adhesive starch paste flows into storage tank 56. It is preferred that storage tanks 56, 66 and 67 have an adhesive starch paste capacity between about 50 and 200 gallons, a quantity of adhesive starch paste which is used in a relatively short period of time and before pumping and circulating can adversely affect the viscosity of the adhesive starch paste.

Each of the storage tanks 56, 66 and 67 is to be equipped with commercially available liquid level controllers 120 which are operatively connected to (not shown) and energize the aforementioned automatic pumps and are operatively connected to (not shown) and open the aforesaid automatic valves when the level of starch adhesive in the storage tanks falls below a preselected quantity, and the liquid level controllers de-energize the aforementioned automatic pumps and close the aforesaid automatic valves when the adhesive within the storage tanks rises to a preselected level indicating the quantity of adhesive which can be used before the occurrence of viscosity breakdown. As can be seen, such controllers 122 will control the automatic delivery of adhesive starch paste to the tanks 56, 66 and 67.

Storage tank 56 is connected to a corrugator unit 70 by a line 72, the line 72 having a pump 74 and a valve 76 interposed therein, and through this line the adhesive starch paste in the storage tank flows to the corrugator unit where three sheets of paper are bonded together in the aforesaid manner.

Corrugator unit 70 is operated continuously and therefore a continuous supply of adhesive starch paste is delivered thereto.

Storage tank 66 is connected to the corrugator unit 70 by a line 78, and disposed in the line is a valve 80 and a pump 82. Storage tank 67 is also connected to the corrugator unit by a line 79, and disposed in the line is a valve 81 and a pump 83.

With valves 64 and 80, and valves 65 and 81 closed storage tanks 66 and 67, respectively, are isolated so that starch adhesive from mixer 54 may not be delivered thereto, and a back row of adhesive starch paste from the corrugator unit 70 may not occur.

All of the pumps which have been identified and which will hereinafter be identified are preferably, but not necessarily, automatically energized and de-energized, and all valves which have been identified and those which will hereinafter be identified are preferably, but not necessarily, automatically opened and closed.

A brief summary of the operation of the described process follows: When the level of the single phase adhesive starch paste in storage tank 56 falls below the preselected level, the liquid level controller located therein substantially simultaneously opens valves 24, 30 and 38, as well as other automatic valves, and pumps 24, 28 and 36 as well as other automatic pumps are energized. If the jet steam cooker 32 is automatically operated, it, too, is actuated at this time. Thus, carrier starch slurry from tank 10 is delivered to the jet steam cooker 32, and while in transit to the jet cooker, a measured quantity of liquid caustic from drum 33 is admixed with the carrier starch slurry. Jet cooker 32 rapidly or flash cooks and gelatinizes the carrier starch slurry mixture, and from the jet cooker the cooked carrier starch slurry mixture passes through surge tank 44, and is blended in blender 50 with the secondary starch slurry and borax mixture delivered to the blender from tank 12. The secondary starch slurry prior to being blended with the cooked carrier starch slurry mixture has had a measured quantity of formaldehyde from drum 15 admixed therewith. The blended slurry mixtures pass into mixer 54 where thorough mixing of the slurry mixtures occurs in order to hold the secondary starch slurry mixture in suspension to produce the single phase adhesive starch paste, and from the mixer the adhesive starch paste is delivered to storage tank 56.

Since the corrugator unit 70 is continuously operating, the adhesive starch paste in storage tank 56 is soon delivered to the corrugator unit and there used. Any excess adhesive starch paste not used at once by the corrugator unit is returned to storage tank 56 via line 84, the line having disposed therein a pump 86 and a valve 88. Joining return line 84 is a return line 85 which communicates with storage tank 66 and in line 85 is a valve 87 which is to be closed to prevent the single phase adhesive starch paste from returning to storage tank 66. Additionally, storage tank 67 is provided with a return line 89 which joins line 85 and in line 89 is a valve 91 which is also to be closed to prevent the returning single phase starch paste from entering storage tank 67.

Generally, the hourly consumption of adhesive starch paste is between about 100 and 200 gallons, and since the capacity of storage tank 56 is between about 50 and 200 gallons, the adhesive starch paste in storage tank 56 is consumed well before viscosity breakdown occurs.

When the level of prepared adhesive starch paste rises in storage tank 56 to the aforementioned preselected level the liquid level controller in the storage tank de-energizes the automatic pumps, closes the automatic valves and stops the operation of jet cooker 32, if the jet cooker is automatically operated.

Thus it may be seen that while the raw starch slurries are in tanks 10 and 12 they are resistant to the mechanical treatment imposed thereon by the agitation, and the carrier starch slurry in tank 10 is gelatinized only when the supply of prepared starch adhesive in storage tank 56 falls below a preselected quantity, and after the carrier starch slurry is gelatinized, it is used well before viscosity breakdown occurs.

Therefore, by avoiding the adverse effects associated with preparing large batches of single phase adhesive starch paste well in advance of use, and instead, preparing automatically and substantially continuously relatively small quantities of adhesive starch paste the uniform viscosity of the single phase adhesive starch paste can be maintained until used.

The preparation of a waterproof adhesive starch paste is also achieved by the process illustrated in the single figure.

A raw starch slurry comprising starch and water is disposed in a tank 90 which has line 27 leading therefrom to the blender 50. Disposed in line 27 is pump 94 which is automatically energized and de-energized by the liquid level controller disposed in the waterproof adhesive starch paste storage tank 66. Also disposed in line 27 is a valve 96 which is automatically opened and closed by the aforementioned liquid level controller.

The starch slurry in tank 90 is charged with resin stored in a drum 97. Delivery of the resin to the starch slurry in tank 90 is by a pump 98 disposed in a line 100, passage of the resin through line 100 being controlled by valve 102.

By properly programming the circuit for operating the various automatic valves 30 and 96 and pumps 28 and 94, tank 12 can be taken off stream and tank 90 can be placed on stream.

To prevent the flow of the prepared waterproof adhesive starch paste to tank 56 or tank 67 valves 65 and 68 are closed, and valve 64 is open to permit flow of the waterproof adhesive starch paste to tank 66. Opening valve 80 downstream of tank 66 permits the flow of the waterproof adhesive starch paste to the corrugator unit 70 and the closing of valves 76 and 81 prevents back flow of the waterproof adhesive starch paste to tanks 56 and 67.

The process for preparing the waterproof adhesive starch paste is substantially the same as that for preparing the regular adhesive starch paste with the exception that the secondary starch slurry mixture which is blended with the carrier starch slurry mixture comes from tank 90 instead of tank 12.

The waterproof adhesive starch paste not immediately used by the corrugator unit 70 is returned to tank 66 by pump 86 via lines 84 and 85 and through valve 87, valves 88 and 91 being closed to prevent flow of the waterproof adhesive into tanks 56 and 67.

The process for preparing double phase adhesive starch paste follows substantially the same procedure as that for preparing the single phase adhesive starch paste. However, the double phase adhesive starch paste has a greater viscosity than the single phase and the increase in viscosity is achieved in the following manner: When the double phase adhesive starch paste in tank 67 falls below a given quantity, the liquid level controller therein energizes most of the automatic pumps and opens most of the automatic valves which were used for preparing the single phase adhesive starch paste, and additionally, pump 37 is energized and valve 39 is opened. The usual quantity of caustic soda is mixed with the carrier starch slurry, and pump 37 measures out an additional but lesser quantity, which is pumped through line 35 which joins line 63. During transit of the caustic soda in line 35, a measured quantity of liquid borax from drum 104 is mixed therewith.

Leading from drum 104 is a line 106 which joins line 35, and interposed in line 106 is a metering pump 108 which is automatically energized and de-energized by the liquid level controller in tank 67. Also located in line 106 is a valve 110 which is automatically opened and closed by the aforementioned liquid level controller.

The mixture of caustic soda and borax in line 35 is mixed with an adhesive starch paste having substantially the same composition as the single phase adhesive starch paste. The mixing of adhesive starch paste, caustic soda and borax occurs in line 63 upstream of tank 67, and it is the additional quantities of borax and caustic soda which converts the single phase adhesive starch paste into double phase adhesive starch paste and produces the greater viscosity.

To insure the production of double phase adhesive starch paste, valves 64 and 68 are closed, and valve 65 is open.

The double phase adhesive starch paste enters into storage tank 67 and when the quantity therein is great enough, the liquid level controller is actuated to de-energize the aforesaid automatic pumps and close the aforesaid automatic valves.

The double phase adhesive starch paste is pumped to the corrugator unit 70 by pump 83, through line 79 and open valve 81, valves 80 and 76 being closed to prevent back flow into tanks 66 and 56, respectively. Excess double phase adhesive starch paste is returned to tank 67 via lines 84, 85 and 89, valve 91 being open and valves 87 and 88 being closed.

An optional piece of equipment, which may be used in conjunction with the process for preparing the single phase starch paste, the waterproof adhesive starch paste and the double phase adhesive starch paste is automatic viscometer controllers 122 connected to each tank 56, 66 and 67 and each of the controllers 122 are operatively connected (shown in dotted lines) to the surge tank 44. Use of the viscometer controller 122 depends on determining the optimum viscosity of the adhesive starch slurries and setting the controller for this viscosity. Following this, if the viscosity in either storage tank 56 or 66 falls below the optimum viscosity, a measured quantity of carrier starch slurry from surge tank 44 is automatically admixed with the respective adhesive starch paste to bring it up to the determined viscosity.

While bonding the three plies of paper together in the aforesaid manner, the sizing, moisture content or porosity of the paper may change from the normal or the operation of the corrugator unit may change which requires a change in the viscosity of the particular adhesive starch paste used at the time. With the viscometer controllers, it is possible to change the viscosity and the composition of the particular adhesive starch paste to compensate for the change in the characteristics of the paper and the change in operation of the corrugator unit. When the characteristics of the paper returns to the normal, and the operation of the corrugator unit returns to the normal, the setting of the viscosity controller may be returned to the setting from which it was changed.

Although the processes described have included the preferred step of delivering the adhesive starch paste to storage or surge tanks, it is to be understood that the particular adhesive starch paste may be delivered directly to the corrugator unit 70, and be supplied according to the demands of the corrugator unit.

The composition of the single phase adhesive starch paste, the double phase adhesive starch paste and the waterproof adhesive starch paste is well known and is not considered a part of this invention.

It is to be understood that the number and location of the various valves and pumps illustrated in the single figure are only representative and are not to be considered limitations.

The various mechanical components employed in the processes, such as the valves, pumps, storage or surge tanks, drums, liquid level controllers, mixers, blenders, jet stream cookers and the like, are relatively common items which are readily available and which do not include unique features so far as this invention is concerned.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims so as to embrace any and all equivalent methods.

What is claimed is:

1. A process for preparation and continuous delivery of a finished starch adhesive while maintaining throughout delivery a relatively stable viscosity comprising: blending raw starch with water to provide an uncooked starch slurry; blending additional raw starch with water to provide a secondary starch slurry; admixing a caustic with a portion of said uncooked starch slurry to provide a carrier starch slurry mixture; flowing said mixture through a jet cooker in a controlled volume directly related to the delivered volume of said finished starch adhesive; flash cooking said mixture as it flows through said cooker producing a gelatinized mixture of relatively stable viscosity; flowing said gelatinized mixture to a blender and flowing a portion of said secondary starch slurry to the blender; blending said gelatinized mixture and said portion of said secondary starch slurry to intermix the two materials in the blender in preparation for further mixing; flowing the blended intermixture to a mixer; thoroughly mixing said blended intermixture to intimately combine the ingredients of the intermixture to produce a finished starch adhesive wherein the gelatinized mixture becomes a carrier to hold said uncooked starch slurry in suspension and said finished starch adhesive has a relatively stable viscosity; delivering said finished starch adhesive to a surge tank for relatively temporary storage; flowing said finished starch adhesive continuously from said surge tank to the site of use at a volume and rate to evacuate the finished starch adhesive while it retains its relatively stable viscosity; and using a measuring and control device responsive to the quantity of finished starch adhesive remaining available for delivery to the site of use and discontinuing or resuming the cooking and third recited blending steps in sequences depending upon the measuring and control device which produces a volume of finished starch adhesive adequate to maintain a predetermined quantity of same available to assure a continuous flow to the site of use.

2. A process for preparation and continuous delivery to a site of use of a finished starch adhesive as defined in claim 1 including the further step of delivering said gelatinized mixture from said cooker to a surge tank for relatively temporary storage prior to flowing said gelatinized mixture to said blender.

3. A process for preparation and continuous delivery to a site of use of a finished starch adhesive as defined in claim 1 including the further steps of returning the unused finished starch adhesive from said site of use to said surge tank and admixing said unused finished starch adhesive with finished starch adhesive in said surge tank.

4. A process for preparation and continuous delivery to a site of use of a finished starch adhesive while maintaining throughout delivery a relatively stable viscosity comprising: blending raw starch with water to provide an uncooked starch slurry; blending additional raw starch with water to provide a secondary starch slurry; flash cooking a portion of said uncooked starch slurry to produce a gelatinized mixture of relatively stable viscosity in a controlled volume directly related to the delivered volume of said finished starch adhesive; thoroughly blending said gelatinized mixture and a portion of said secondary starch slurry to intimately combine the ingredients to produce a finished starch adhesive wherein the gelatinized mixture becomes a carrier to hold said secondary starch slurry in suspension and to impart and maintain a relatively stable viscosity to said finished starch adhesive; flowing said finished starch adhesive to the site of use while in said condition of relatively stable viscosity; and using a measuring and control device responsive to the quantity of finished starch adhesive remaining available for delivery to the site of use and discontinuing or resuming the cooking and third recited blending steps in sequences depending upon the measuring and control device which produces a volume of finished starch adhesive adequate to maintain a predetermined quantity of same available to assure a continuous flow to the site of use.

5. A process for preparation and continuous delivery of a finished starch adhesive while maintaining throughout delivery a relatively stable viscosity comprising: blending raw starch with water to provide an uncooked starch slurry; blending additional raw starch with water to provide a secondary starch slurry; admixing a caustic with a portion of said uncooked starch slurry to provide a carrier starch slurry mixture; flowing said mixture through a jet cooker in a controlled volume directly related to the delivered volume of said finished starch adhesive; flash cooking said mixture as it flows through said cooker producing a gelatinized mixture of relatively stable viscosity; flowing said gelatinized mixture to a blender and flowing a portion of said secondary starch slurry to the blender; blending said gelatinized mixture and said portion of said secondary starch slurry to intermix the two materials in the blender in preparation for further mixing; flowing the blended intermixture to a mixer; thoroughly mixing said blended intermixture to intimately combine the ingredients of the intermixture to produce a finished starch adhesive wherein the gelatinized mixture becomes a carrier to hold said uncooked starch slurry in suspension and said finished starch adhesive has a relatively stable viscosity; delivering said finished starch adhesive to a surge tank for relatively temporary storage; flowing said finished starch adhesive continuously from said surge tank to the site of use at a volume and rate to evacuate the finished starch adhesive while it retains its relatively stable viscosity; and programming the steps preliminary to said last recited step to discontinue or resume said preliminary steps so that an adequate volume of finished starch adhesive is produced as required by the flow of said finished starch adhesive to the site of use, the programming of the steps including using a liquid level apparatus responsive to the filling or evacuation of the finished starch adhesive from the surge tank to control the preliminary steps.

6. A process for preparation and continuous delivery to a site of use of a finished starch adhesive while maintaining throughout delivery a relatively stable viscosity comprising: blending raw starch with water to provide an uncooked starch slurry; blending additional raw starch with water to provide a secondary starch slurry; flash cooking a portion of said uncooked starch slurry to produce a gelatinized mixture of relatively stable viscosity in a controlled volume directly related to the delivered volume of said finished starch adhesive; thoroughly blending said gelatinized mixture and a portion of said secondary starch slurry to intimately combine the ingredients to produce a finished starch adhesive wherein the gelatinized mixture becomes a carrier to hold said secondary starch slurry in suspension and to impart and maintain a relatively stable viscosity to said finished starch adhesive; flowing said finished starch adhesive to the site of use while in said condition of relatively stable viscosity; and programming the cooking and third recited blending steps to discontinue or resume the same so that an adequate volume of finished starch adhesive is produced as required by the flow of said finished starch adhesive to the site of use, the programming of the cooking and third recited blending steps including passing the finished starch adhesive through a surge tank enroute to the site of use and employing liquid level apparatus in the surge tank to effect control of the cooking and third recited blending steps.

References Cited by the Examiner

UNITED STATES PATENTS

| | | | |
|---|---|---|---|
| 2,102,937 | 12/1937 | Bauer | 156—336 |
| 3,004,855 | 10/1961 | Smith | 106—213 |
| 3,019,120 | 1/1962 | Bauer | 106—213 |

FOREIGN PATENTS 474,583 11/1937 Great Britain.

OTHER REFERENCES

Webb, J. J. et al., "Starch Adhesives for Corrugated Board," Adhesives and Resins, vol. 8, Nos. 7–8, July–August 1960, pp. 69–72, 156–336.

Kerr, R. W., "Chemistry and Industry of Starch," Academic Press Inc., publishers, 1950, New York; pp. 595–598.

ALEXANDER H. BRODMERKEL, *Primary Examiner.*

JOSEPH REBOLD, MORRIS LIEBMAN, *Examiners.*

J. E. CARSON, L. HAYES, *Assistant Examiners.*